United States Patent
Sugaya

(10) Patent No.: US 11,962,882 B2
(45) Date of Patent: Apr. 16, 2024

(54) OPTICAL MEMBER CONTROL APPARATUS, IMAGE CAPTURE APPARATUS, AND CONTROL METHOD

(71) Applicant: CANON KABUSHIKI KAISHA, Tokyo (JP)

(72) Inventor: Tomohiro Sugaya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 557 days.

(21) Appl. No.: 17/223,301

(22) Filed: Apr. 6, 2021

(65) Prior Publication Data
US 2021/0318508 A1    Oct. 14, 2021

(30) Foreign Application Priority Data

Apr. 10, 2020 (JP) .................................. 2020-071198

(51) Int. Cl.
| | |
|---|---|
| H04N 23/55 | (2023.01) |
| G02B 7/00 | (2021.01) |
| G02B 26/02 | (2006.01) |

(52) U.S. Cl.
CPC ........... *H04N 23/55* (2023.01); *G02B 26/023* (2013.01); *G02B 7/006* (2013.01)

(58) Field of Classification Search
CPC ... G03B 9/42; G02B 7/005–006; H04N 23/75
See application file for complete search history.

(56) References Cited

U.S. PATENT DOCUMENTS

| | | | | |
|---|---|---|---|---|
| 9,998,682 | B2* | 6/2018 | Uchida | .................. G03B 7/097 |
| 2018/0069995 | A1 | 3/2018 | Lim et al. | |

FOREIGN PATENT DOCUMENTS

| | | |
|---|---|---|
| EP | 2453282 A1 | 5/2012 |
| EP | 2952959 A1 | 12/2015 |
| JP | 2011-107600 A | 6/2011 |
| JP | 2019-066801 A | 4/2019 |
| JP | 2019066801 A | 4/2019 |

OTHER PUBLICATIONS

The above documents were cited in a British Search Report dated Oct. 27, 2021, which is enclosed, that issued in the corresponding British Patent Application No. 2103532.4.

(Continued)

*Primary Examiner* — Leon W Rhodes, Jr.
(74) *Attorney, Agent, or Firm* — Cowan, Liebowitz & Latman, P.C.

(57) ABSTRACT

An optical member control apparatus comprises a first optical member and a second optical member that are arranged to be movable on the same plane that intersects an optical path of light that enters an image capturing element, and when movement is performed to insert either one of the first optical member and the second optical member into the optical path and to retract the other of the first optical member and the second optical member from the optical path, performs control such that movement of the optical member that is to be inserted into the optical path is started after movement of the optical member that is to be retracted from the optical path is started and before the movement is complete.

9 Claims, 8 Drawing Sheets

(56) References Cited

OTHER PUBLICATIONS

The above document was cited in a British Search Report dated Mar. 3, 2023, which is enclosed, that issued in the corresponding British Patent Application No. 2103532.4.

The above foreign patent document was cited in the Aug. 31, 2023 German Office Action, which is enclosed without an English Translation, that issued in German Patent Application No. 10 2021 108 789.9.

* cited by examiner

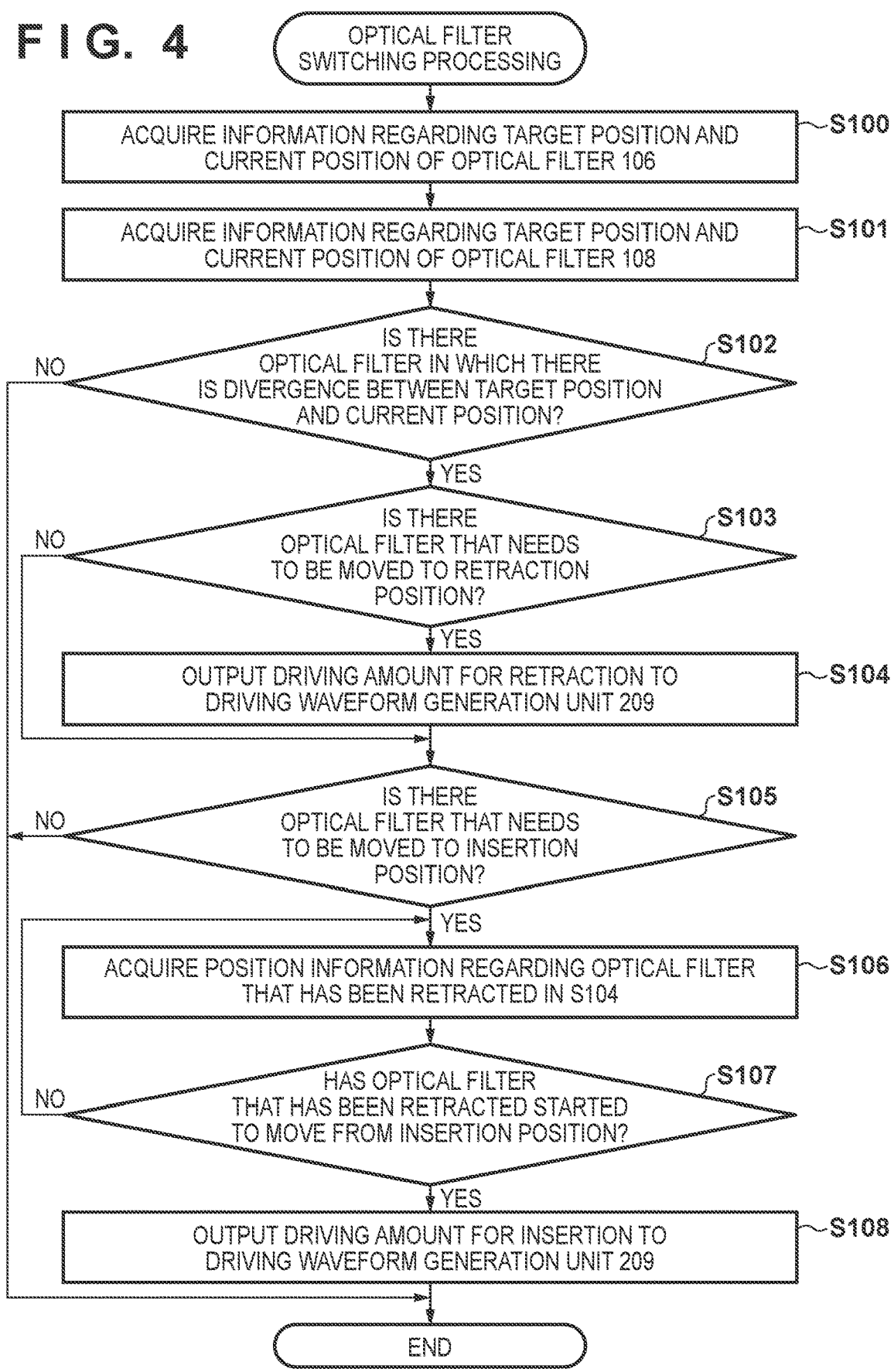

OPTICAL MEMBER CONTROL APPARATUS, IMAGE CAPTURE APPARATUS, AND CONTROL METHOD

BACKGROUND OF THE INVENTION

Field of the Invention

The present invention relates to techniques for controlling operations of optical members.

Description of the Related Art

As an example of an optical member control apparatus that controls optical members that change characteristics of an optical image entering an image sensor in an image capture apparatus, such as a digital camera, there is an optical member control apparatus that causes a plurality of separately movable optical filters (e.g. neutral density (ND) filters, infrared (IR) cut filters, etc.) that have different optical characteristics to be inserted into or removed from an optical path by separately moving the optical filters, for example. A user can capture an image under optimum conditions by arranging an appropriate optical filter on the optical path according to a shooting environment or a shooting intention by using the optical member control apparatus.

Japanese Patent Laid-Open No. 2019-66801 proposes an optical member control apparatus in which a plurality of optical filters are arranged on planes that are orthogonal to an optical axis of an image capturing optical system, and the size and the thickness of the optical member control apparatus are reduced by arranging two optical filters on the same plane.

However, if two optical filters are arranged on the same plane as described in Japanese Patent Laid-Open No. 2019-66801, switching of an optical filter that is on an optical path is performed through an exclusive operation in which movement of the other optical filter is started after waiting for the optical filter to retract from the optical path, and this operation takes a longer time when compared to a case where a single optical filter is moved. In this case, it is possible to reduce a switching time by moving one of the optical filters to the outside of the optical path and moving the other optical filter to the optical path at the same time, but there is a possibility of the optical filters coming into contact with or colliding with each other.

SUMMARY OF THE INVENTION

The present invention has been made in consideration of the aforementioned problems, and realizes techniques that can reduce the time it takes to switch optical members and reduce the possibility of the optical members coming into contact with or colliding with each other, when at least two optical members move on the same plane that intersects an optical axis.

In order to solve the aforementioned problems, the present invention provides an optical member control apparatus comprising: a first optical member and a second optical member that are arranged to be movable on the same plane that intersects an optical path of light that enters an image capturing element, a drive unit capable of independently moving the first optical member and the second optical member; and a memory and at least one processor and/or at least one circuit which function as: a control unit configured to control movement of the first optical member and the second optical member, wherein, when movement is performed to insert either one of the first optical member and the second optical member into the optical path and to retract the other of the first optical member and the second optical member from the optical path, the control unit performs control such that movement of the optical member that is to be inserted into the optical path is started after movement of the optical member that is to be retracted from the optical path is started and before the movement is complete.

In order to solve the aforementioned problems, the present invention provides a method of controlling an optical member control apparatus which has a first optical member, a second optical member, and a drive unit, the first optical member and the second optical member being arranged to be movable on the same plane that intersects an optical path of light that enters an image capturing element, the drive unit being capable of independently moving the first optical member and the second optical member, the method comprising: controlling movement of the first optical member and the second optical member, wherein, in the controlling, when movement is performed to insert either one of the first optical member and the second optical member into the optical path and to retract the other of the first optical member and the second optical member from the optical path, control is performed such that movement of the optical member that is to be inserted into the optical path is started after movement of the optical member that is to be retracted from the optical path is started and before the movement is complete.

In order to solve the aforementioned problems, the present invention provides a non-transitory computer-readable storage medium storing a program for causing a computer to execute a method of controlling an optical member control apparatus which has a first optical member, a second optical member, and a drive unit, the first optical member and the second optical member being arranged to be movable on the same plane that intersects an optical path of light that enters an image capturing element, the drive unit being capable of independently moving the first optical member and the second optical member, the method comprising: controlling movement of the first optical member and the second optical member, wherein, in the controlling, when movement is performed to insert either one of the first optical member and the second optical member into the optical path and to retract the other of the first optical member and the second optical member from the optical path, control is performed such that movement of the optical member that is to be inserted into the optical path is started after movement of the optical member that is to be retracted from the optical path is started and before the movement is complete.

In order to solve the aforementioned problems, the present invention provides an image capture apparatus comprising: an image capturing element; and an optical member control apparatus that comprises a first optical member and a second optical member that are arranged to be movable on the same plane that intersects an optical path of light that enters an image capturing element and that can be inserted into the optical path and can be retracted from the optical path, a drive unit capable of independently moving the first optical member and the second optical member, and a control unit configured to control movement of the first optical member and the second optical member, wherein, when movement is performed to insert either one of the first optical member and the second optical member into the optical path and to retract the other of the first optical member and the second optical member from the optical path, the control unit performs control such that movement of the optical member that is to be inserted into the optical path is started after movement of the optical member that is to be retracted from the optical path is started and before the movement is complete.

In order to solve the aforementioned problems, the present invention provides an image capture apparatus comprising an image capturing element, wherein the image capture apparatus is configured such that an optical member control apparatus is attachable to and detachable from the image capture apparatus, and the optical member control apparatus comprises a first optical member and a second optical member that are arranged to be movable on the same plane that intersects an optical path of light that enters an image capturing element and that can be inserted into the optical path and can be retracted from the optical path, a drive unit capable of independently moving the first optical member and the second optical member, and a control unit configured to control movement of the first optical member and the second optical member, wherein, when movement is performed to insert either one of the first optical member and the second optical member into the optical path and to retract the other of the first optical member and the second optical member from the optical path, the control unit performs control such that movement of the optical member that is to be inserted into the optical path is started after movement of the optical member that is to be retracted from the optical path is started and before the movement is complete.

According to the present invention, it is possible to reduce the time it takes to switch optical members and reduce the possibility of the optical members coming into contact with or colliding with each other when at least two optical members move on the same plane that intersects an optical axis.

Further features of the present invention will become apparent from the following description of exemplary embodiments (with reference to the attached drawings).

BRIEF DESCRIPTION OF THE DRAWINGS

FIG. 4 is a flowchart showing control processing relating to operations for switching optical filters in the first embodiment.

DESCRIPTION OF THE EMBODIMENTS

Figure 1:
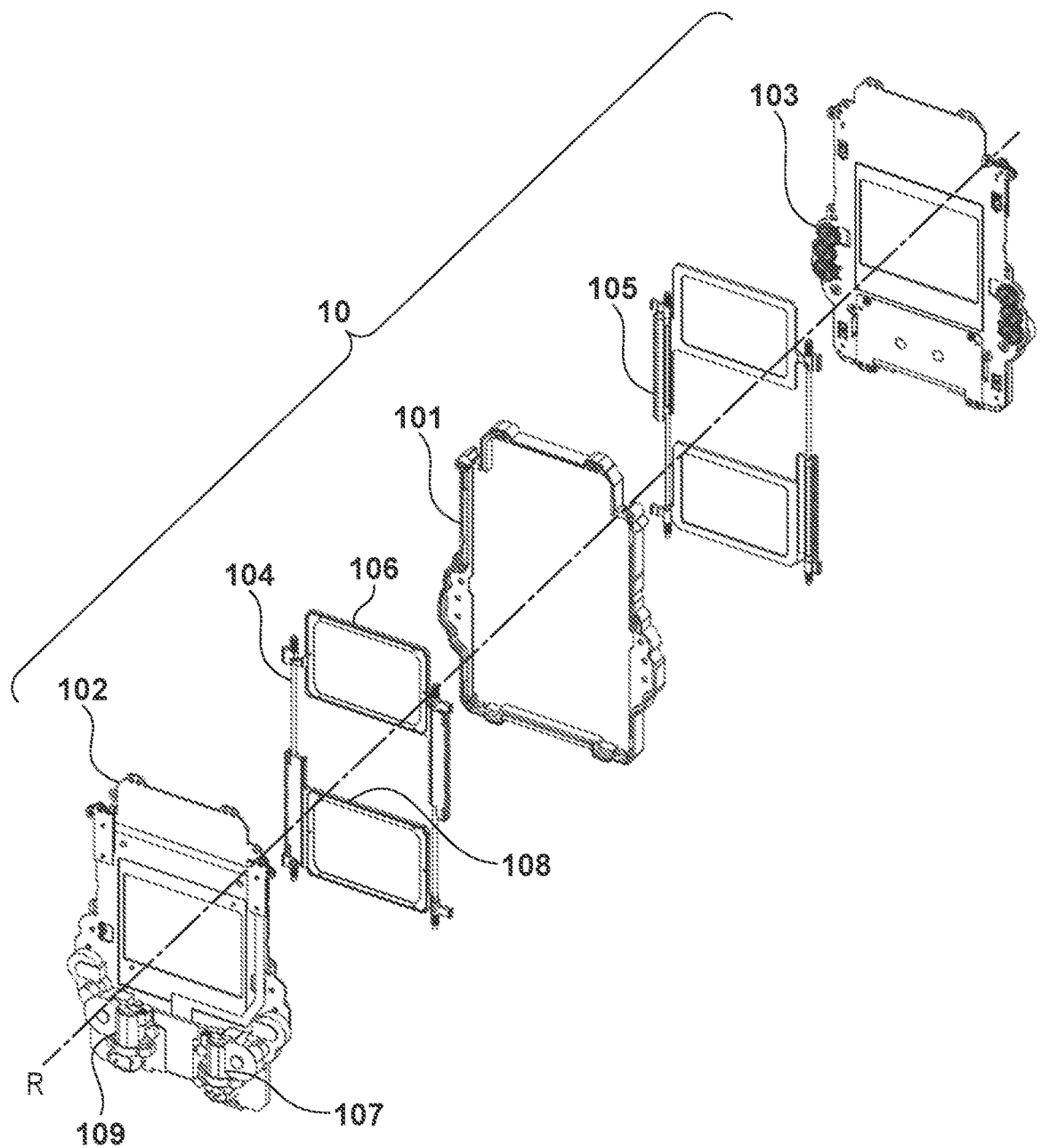
FIG. 1 is an exploded perspective view showing an appearance configuration of an optical member control apparatus according to a present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

The following describes, with reference to the drawings, an embodiment that is applied to an optical filter apparatus that is built in or additionally attached to an image capture apparatus, such as a digital camera, as an optical member control apparatus of the present invention.

In the present embodiment, a subject side in an optical axis direction of the image capture apparatus will be referred to as a forward side or a front side and the opposite side will be referred to as a rear side or a back side. Also, an up-down direction and a left-right direction of the image capture apparatus are defined viewing the image capture apparatus that is in a normal position from the forward side.

As shown in FIG. 1, an optical filter apparatus 10 includes a hollow frame-shaped holding member 101, a first driving unit 102, a second driving unit 103, a first optical filter unit 104, and a second optical filter unit 105.

The first optical filter unit 104 includes an optical filter 106 and an optical filter 108 that are independently movable optical members, and the driving unit 102 includes a motor 107 and a motor 109. The motor 107 converts electric power that is supplied from a motor driver, which will be described later, to motive power, and the motive power is converted as a driving force of the optical filter 106 by a power transmission mechanism such as a gear, to enable the optical filter 106 to move in the up-down direction. Similarly, the optical filter 108 is enabled to move in the up-down direction with motive power of the motor 109. Note that in the present embodiment, the center of an optical axis of a lens is shown with an optical axis R. Also, the first optical filter unit 104 and the second optical filter unit 105 have similar configurations, and therefore the following describes the configuration of the first optical filter unit 104 and omits description of the second optical filter unit 105.

Figure 2:
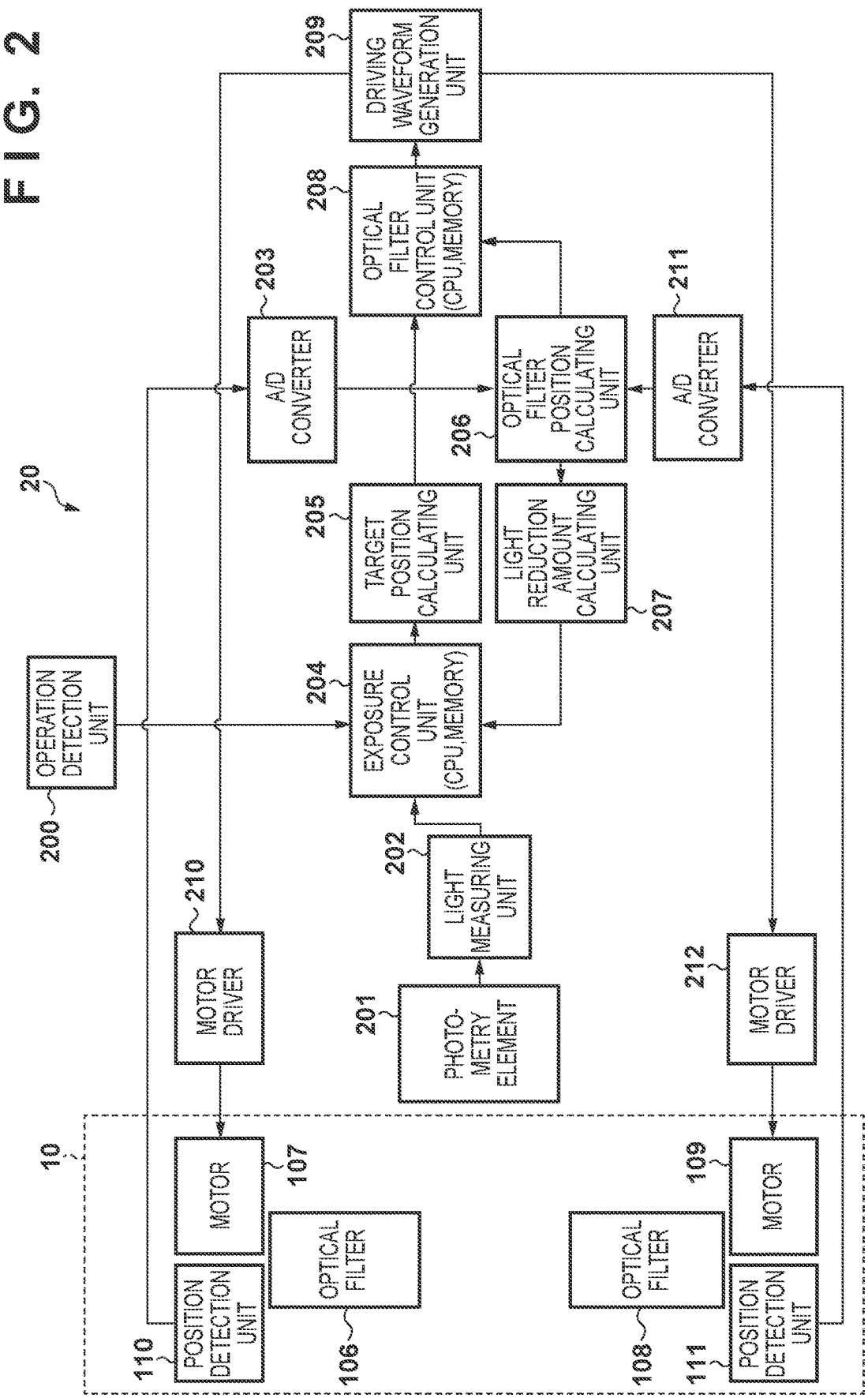
FIG. 2 is a block diagram showing an internal configuration of an optical member control apparatus according to a first embodiment.

FIG. 2 shows an example of functional blocks of the optical filter apparatus 10 and an image capture apparatus 20 to which the optical filter apparatus 10 is attached.

In a case where the image capture apparatus 20 is a digital camera, the image capture apparatus 20 includes functions for capturing an image of a subject, generating image data, and storing the image data as an image file in a storage device or outputting the image data to a display device or an external apparatus, but these constitutional elements and functions are known and therefore details thereof are not described in the present embodiment.

The image capture apparatus 20 can capture an image under optimum shooting conditions as a result of an appropriate optical filter being arranged on an optical path according to a shooting environment, a shooting intention, or the like.

Note that the optical filters 106 and 108 are stopped at positions that are determined in advance except for during switching operations, which will be described later, and a stopped position on the optical path (a position at which the optical filters intersect the optical axis (at right angles)) is defined as an insertion position, and a stopped position that is outside the optical path is defined as a retraction position.

The optical filter apparatus 10 includes a position detection unit 110 that detects the position of the optical filter 106 and a position detection unit 111 that detects the position of the optical filter 108, in addition to the optical filters 106 and 108 and the motors 107 and 109. The optical filter 106 can move in the up-down direction as described above, and the position detection unit 110 includes a retraction position side switch that is turned ON when the optical filter 106 has moved to the retraction position and an insertion position side switch that is turned ON when the optical filter 106 has moved to the insertion position. The position detection unit 111 has a configuration similar to that of the position detection unit 110, and can detect the retraction position and the insertion position of the optical filter 108. Note that members that constitute the position detection units 110 and 111 are not limited to the switches that are turned ON or OFF, and a configuration is also possible in which positions are detected based on light reception/interruption using a photo-interrupter or positions are detected using a Hall-effect element that detects changes in magnetic fields of magnets that are included in the optical filters.

The image capture apparatus 20 adjusts the amount of light of a subject image that enters an image capturing element 201, which will be described later, by inserting the optical filter 106 or 108 into the optical axis and/or causing the optical filter 106 or 108 to retract from the optical axis. Insertion and retraction of the optical filters 106 and 108 may be performed according to operations that are made by a user who is capturing an image or through automatic exposure control of the image capture apparatus 20.

The image capture apparatus 20 includes an operation detection unit 200. The operation detection unit 200 detects user operation information and outputs the user operation information to an exposure control unit 204. The user operation information is, for example, information regarding an operation such as pressing down an operation member that is provided in the image capture apparatus 20 or an operation that is made on a remote control that is connected to the image capture apparatus 20. It is possible to directly set insertion and retraction of the optical filters or a light reduction amount through a user operation. The image capturing element 201 includes an image sensor, such as a CCD or a CMOS, that converts a subject image to an electrical signal.

A photometry unit 202 detects luminance information based on a captured image signal that is output from the image capturing element 201 and outputs the detected luminance information to the exposure control unit 204. The exposure control unit 204 includes a processor such as a CPU and a memory, and determines a target light reduction amount of the optical filters using information that is output from the photometry unit 202 or information that is output from the operation detection unit 200. The image capture apparatus 20 can select a plurality of exposure modes, and the user can set the exposure modes by operating a menu screen, for example. If the image capture apparatus 20 is set to a mode in which exposure is automatically controlled to be appropriate, a target light reduction amount that is to be achieved using the optical filters 106 and 108 is determined such that a luminance value of a subject image that enters the image capturing element 201 becomes an appropriate value, based on a difference between a luminance value detected by the photometry unit 202 and the appropriate value that is determined in advance. In the case of a mode in which the user determines a luminance value of a subject image by manually operating an operation member, the target light reduction amount of the optical filters is determined based on user operation information detected by the operation detection unit 200.

Here, a method for determining the target light reduction amount of the optical filters in the exposure control unit 204 will be described.

Alight reduction amount of an optical filter that has currently been inserted into the optical path is acquired from a light reduction amount calculating unit 207. For example, assume that the optical filter 106 is an ND filter that has a visible light transmittance of about 25% and reduces the amount of light by an amount that corresponds to two levels and the optical filter 108 is an ND filter that has a visible light transmittance of about 6.3% and reduces the amount of light by an amount that corresponds to four levels. Note that reducing the amount of light by an amount that corresponds to one level means halving the amount of light. If the optical filter 106 is at the insertion position, the exposure control unit 204 can acquire information indicating that the light reduction amount corresponds to two levels, from the light reduction amount calculating unit 207. If the user has made an operation for further reducing the amount of light by an amount that corresponds to two levels, a request for an additional reduction by an amount corresponding to two levels is issued from the operation detection unit 200. The exposure control unit 204 outputs a target light reduction amount of the optical filters that corresponds to four levels to a target position calculating unit 205 based on information indicating the additional reduction by an amount corresponding to two levels, which is requested by the user with respect to the current light reduction amount of the optical filters, which corresponds to two levels. Note that, in the case of an automatic exposure mode, the exposure control unit 204 determines the target light reduction amount of the optical filters by adding or subtracting a difference between a current luminance value and an appropriate luminance value to or from the current light reduction amount acquired from the light reduction amount calculating unit 207, as described above. However, a device that reduces the amount of light of a subject image that enters the image capturing element 201 may also be used in combination with a mechanism other than the optical filters. For example, a diaphragm that reduces the amount of light that enters the image capturing element 201 by narrowing the optical path may be used.

The target position calculating unit 205 calculates insertion information or retraction information regarding each optical filter based on the target light reduction amount acquired from the exposure control unit 204. In the example described above, a light reduction amount corresponding to four levels is input as a target value that is to be achieved using the optical filters, and accordingly, target positions are determined to retract the optical filter 106, which reduces the amount of light by an amount corresponding to two levels, and insert the optical filter 108, which reduces the amount of light by an amount corresponding to four levels, and the target positions are output to an optical filter control unit 208. The optical filter control unit 208 includes a processor such as a CPU and a memory, and performs control to move the optical filters to the target positions of the respective optical filters, which are input from the target position calculating unit 205. The optical filter control unit 208 controls selective movement of the optical filters and timings at which retraction movement and insertion movement of the optical filters are started, as described later. The optical filter control unit 208 outputs a target driving amount to a driving waveform generation unit 209 when starting movement of the optical filter 106 or 108. The driving waveform generation unit 209 acquires a target driving amount and outputs a motor driving waveform to a motor driver 210.

Here, an example of operations of respective units when causing the optical filter 106 to retract and inserting the optical filter 108 will be described.

Assume that the motors 107 and 109 are stepping motors. The optical filter control unit 208 outputs the number of driving pulses/driving speed. The number of driving pulses that are required to move an optical filter between the insertion position and the retraction position is determined in advance based on the configuration of the optical filter apparatus 10. The driving waveform generation unit 209 generates sine waves for controlling a rotation angle of a stepping motor according to the input number of pulses. The stepping motor can be rotated in a forward direction by shifting phases of a sine wave A and a sine wave B by 90° and advancing the phase of the sine wave A relative to the sine wave B, and the stepping motor can be rotated in a reverse direction by advancing the phase of the sine wave B relative to the sine wave A. The motor driver 210 and a motor driver 212 each include an H bridge circuit. As a result of sine waves C and D that are opposite in phase to the input sine waves A and B being generated and the sine waves A to D being input to the motors 107 and 109, a magnetic force is generated by stator coils of the stepping motors and rotors are magnetized, whereby the motors rotate.

An A/D converter 203 converts an analog signal that is output from the position detection unit 110 to digital data and outputs the digital data to an optical filter position calculating unit 206. An A/D converter 211 similarly converts an analog signal that is output from the position detection unit 111 to digital data and outputs the digital data. The optical filter position calculating unit 206 converts data output from the A/D converters 203 and 211 to position information of at least three patterns, i.e., the insertion position of the optical filter 106 or 108, the retraction position of the optical filter 106 or 108, and a position during movement, which is neither the insertion position nor the retraction position (i.e., the position is indefinite). Except for information indicating that the position is indefinite being included, information that is output from the optical filter position calculating unit 206 is information of the same type (insertion position/retraction position) as information that is output from the target position calculating unit 205. The light reduction amount calculating unit 207 outputs the light reduction amount of an optical filter that is currently at the insertion position based on information indicating insertion or retraction regarding the optical filters 106 and 108. For example, if the optical filter 106 is at the insertion position, a current light reduction amount that corresponds to two levels is output, if the optical filter 108 is at the insertion position, a current light reduction amount that corresponds to four levels is output, and if the optical filters 106 and 108 are at the retraction positions, a current light reduction amount that corresponds to zero level is output.

Next, operations that are performed when the optical filters are switched according to the first embodiment will be described with reference to FIGS. 3A, 3B, and 4.

Figure 3A:
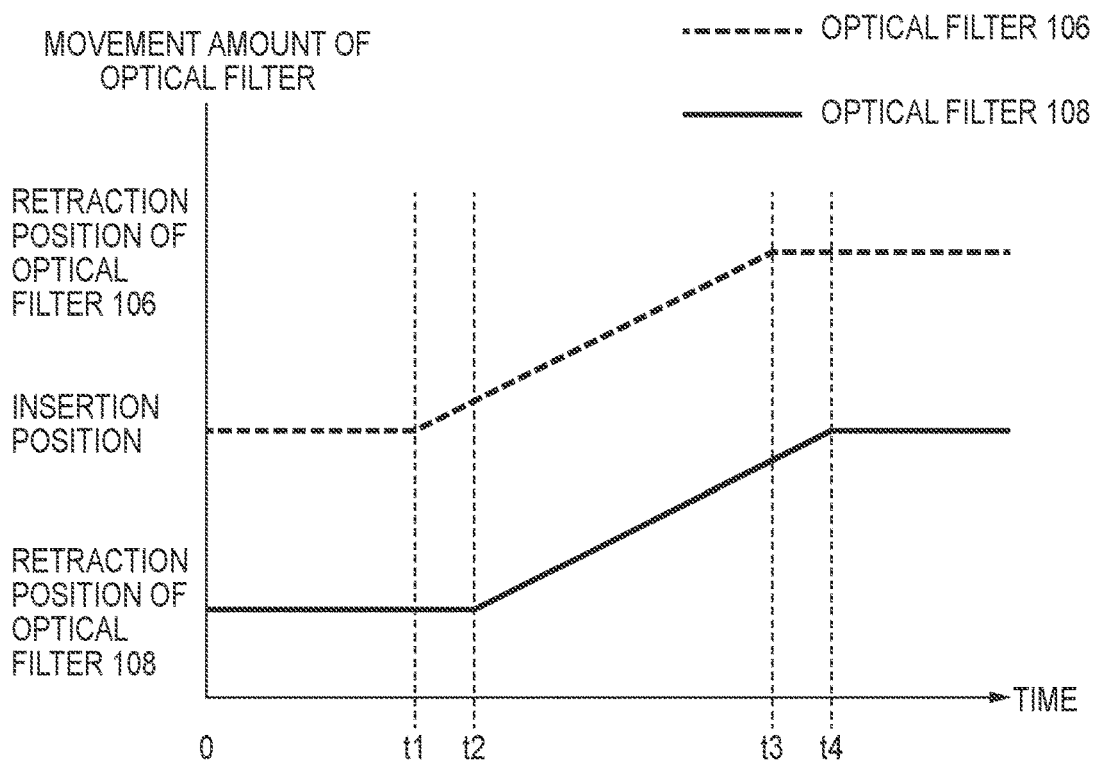
FIGS. 3A and 3B are diagrams showing a relationship between movement amounts and detected positions of optical filters in the first embodiment.
Figure 3B:
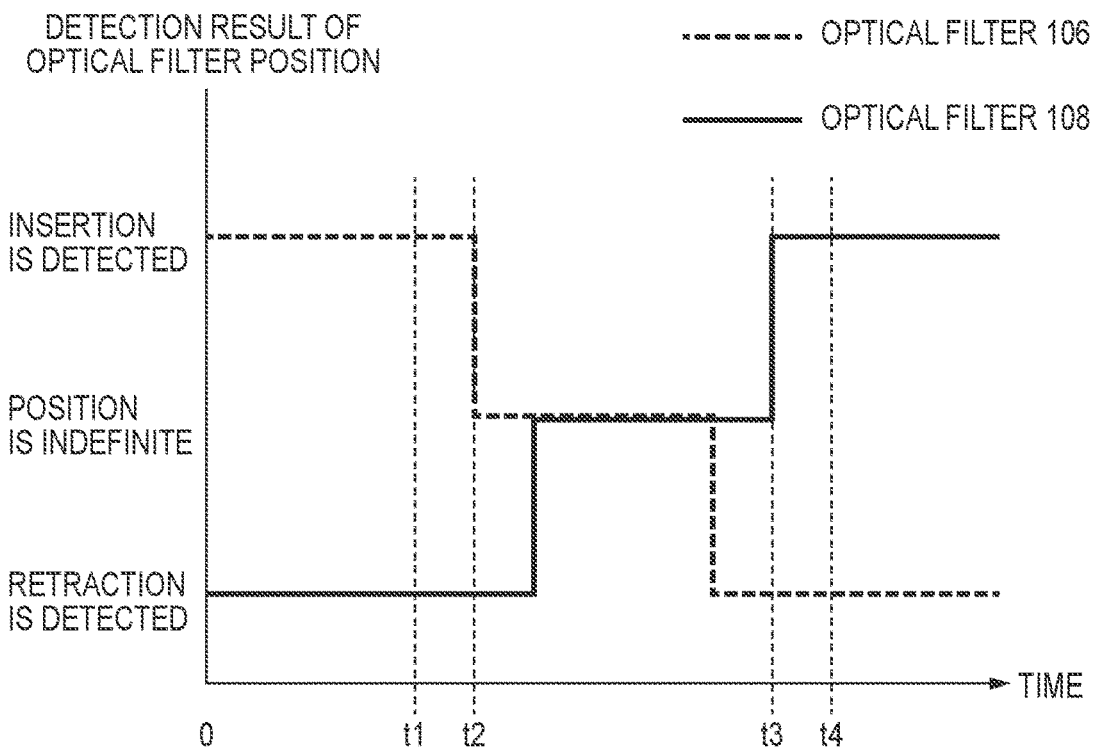

FIGS. 3A and 3B show an example of a relationship between movement amounts and detected positions when the optical filters 106 and 108 are switched according to the first embodiment. FIG. 4 shows an example of control processing that is performed when the optical filters 106 and 108 are switched according to the first embodiment.

In the present embodiment, assume that the optical filter 106 reduces the amount of light by an amount that corresponds to two levels and the optical filter 108 reduces the amount of light by an amount that corresponds to four levels as described above. The following describes example operations that are performed in a case where the optical filter 106 is at the insertion position and the optical filter 108 is at the retraction position in an initial state, and the optical filter 106 is retracted and the optical filter 108 is inserted, through a user operation or automatic exposure control of the image capture apparatus 20 to reduce the amount of light by an amount that corresponds to four levels.

In FIG. 3A, the vertical axis indicates movement amounts of the optical filters 106 and 108 and the horizontal axis indicates time points. A graph that is shown with a dashed line shows the trajectory of movement of the optical filter 106, and a graph that is shown with a solid line shows the trajectory of movement of the optical filter 108. In FIG. 3B, the vertical axis indicates position detection results of the optical filters and the horizontal axis indicates time points. A graph that is shown with a dashed line shows the position detection result of the optical filter 106, and a graph that is shown with a solid line shows the position detection result of the optical filter 108.

At a time point t1, the target value of light reduction, which corresponds to four levels, is set by the exposure control unit 204, and retraction movement of the optical filter 106 is started in response to the setting of the target value. Note that there is no delay between the output of the target value from the exposure control unit 204 and the start of movement of the optical filter. After movement of the optical filter 106 is started, the insertion position side switch of position detection switches is turned OFF at a time point 2. As a result, the position detection result regarding the optical filter 106 indicates that the optical filter is moving, i.e., the position is indefinite. Here, there is a delay between the time point t1 at which movement of the optical filter 106 is started and the time point at which the position detection result changes from a state where insertion is detected to a state where the position is indefinite, because the number of driving pulses that is output from the optical filter control unit 208 to insert or retract an optical filter is set to be greater, by a predetermined amount, than a value that corresponds to a position at which a switch is turned ON, to drive the optical filter by an extra amount. This processing is performed to prevent a situation in which an ON state of the switch is canceled as a result of vibration or the like being applied to the image capture apparatus 20 and the position becomes indefinite, such a situation may occur if driving of the optical filter is stopped when the switch is turned ON. Note that, in the configuration described above, the optical filter control unit 208 outputs the number of driving pulses that is determined in advance, but the configuration also includes processing for correcting the number of driving pulses based on a position detection result, such as a case where the number of driving pulses is initially output to start movement of the optical filter, and thereafter if detection of the insertion position or the retraction position is confirmed, extra driving pulses described above are additionally generated and the optical filter is stopped.

As a result of retraction movement of the optical filter 106 being detected at the time point t2, insertion movement of the optical filter 108 is started. Then, retraction movement of the optical filter 106 is completed at a time point 3, and insertion movement of the optical filter 108 is completed at a time point 4. Note that the optical filters 106 and 108 move by extra amounts after position detection switches are turned ON, as described above. Therefore, in FIG. 3B, the optical filter 106 is detected as being at the retraction position at a time point that is before the time point t3 at which movement is completed, and the optical filter 108 is detected as being at the insertion position at a time point that is before the time point t4 at which movement is completed.

As described above, movement of the optical filter 108 is started at the time point t2 at which retraction movement of the optical filter 106 is detected, and therefore a delay that occurs due to the movements of the two optical filters is only a period of time between t2 and t1. Therefore, the time it takes to switch the optical filters in response to a user operation or automatic exposure control of the image capture apparatus 20 can be reduced. In contrast, if insertion movement of the optical filter 108 is started at the time point t1, control responsiveness is improved, but there is a possibility of the optical filter 108 coming into contact with or colliding with the optical filter 106. Various factors are conceivable as factors of the collision, such as an error of timing at which a driving waveform is output to a motor, delay of the start of movement due to backlash in a power transmission mechanism such as a gear, and a reduction in driving torque. In the present embodiment, possibilities of the contact and collision described above can be reduced as a result of movement of the optical filter 108 being started at the time point t2 at which retraction movement of the optical filter 106 is detected.

Next, control processing that is performed by the optical filter control unit (hereinafter referred to as a "control unit") 208 to realize operations for switching the optical filters according to the present embodiment will be described with reference to FIG. 4.

Note that the processing shown in FIG. 4 is realized as a result of the optical filter control unit 208 controlling each unit by executing a program that is stored in a memory.

In step S100, the control unit 208 acquires information regarding a target position of the optical filter 106 from the target position calculating unit 205 and acquires information regarding a current position from the optical filter position calculating unit 206. The target position of the optical filter 106 is the retraction position and the current position of the optical filter 106 is the insertion position.

In step S101, the control unit 208 acquires information regarding a target position and a current position of the optical filter 108. The target position of the optical filter 108 is the insertion position and the current position of the optical filter 108 is the retraction position.

In step S102, the control unit 208 determines whether or not there is an optical filter that needs to be moved. This determination is performed to reduce unnecessary processing by immediately ending the processing if there is no optical filter that needs to be moved. The processing in step S102 is not essential because whether or not there is an optical filter that needs to be inserted or needs to be retracted is determined in steps S103 and S105, which will be described later. In the present processing, there is a divergence between the target position and the current position with respect to both of the optical filters 106 and 108, and therefore the processing proceeds to step S103.

In step S103, the control unit 208 determines whether or not there is an optical filter that needs to be moved to the retraction position. If there is an optical filter that needs to be moved to the retraction position, the processing proceeds to step S104, and if there is no optical filter that needs to be moved to the retraction position, the processing proceeds to step S105. In the present processing, the optical filter 106 needs to be moved to the retraction position, and therefore the processing proceeds to step S104.

In step S104, the control unit 208 outputs a driving amount for retraction to the driving waveform generation unit 209. Then, the motor 107 is rotated by a predetermined amount via the motor driver 210, using sine waves that are output from the driving waveform generation unit 209, and the optical filter 106 continuously moves until the optical filter reaches the retraction position. After the driving amount is output in step S104, the processing proceeds to step S105.

In step S105, the control unit 208 determines whether or not there is an optical filter that needs to be moved to the insertion position. If there is an optical filter that needs to be moved to the insertion position, the processing proceeds to step S106, and if there is no optical filter that needs to be moved to the insertion position, the processing ends. In the present processing, the optical filter 108 needs to be moved to the insertion position, and therefore the processing proceeds to step S106.

In step S106, the control unit 208 again acquires position information regarding the optical filter 106 of which retraction movement has been started in step S104. It is necessary to acquire the position information regarding the optical filter 106 as described in step S106 to make the start of movement of the optical filter 108 match a timing at which the start of retraction movement of the optical filter 106 is detected as described with reference to FIGS. 3A and 3B.

In step S107, the control unit 208 determines whether or not the optical filter 106 has started to move from the insertion position based on the information acquired in step S106. Specifically, if the insertion position side switch of the position detection unit 110 has been turned OFF and information indicating that the position is indefinite can be acquired from the optical filter position calculating unit 206, it is determined in step S107 that movement has been started. Upon determining that movement has been started, the control unit 208 proceeds to step S108. If the insertion position side switch of the position detection unit 110 is in the ON state, the control unit returns to step S106 and again performs the processing in step S106.

Note that, for the sake of convenience of description, the processing in step S106 is repeated in the present embodiment, unless it is determined in step S107 that movement has been started. However, if the start of movement could not be detected in step S106, a different type of processing may also be performed so long as movement of the optical filter 108 is started after movement of the optical filter 106 is started. For example, if it is determined in step S107 that the start of movement could not be detected, it is also possible to end the processing and again start the processing from step S106 after a predetermined period of time has elapsed.

Alternatively, if it is determined in step S107 that the start of movement could not be detected, it is also possible to temporarily suspend the processing (i.e., enter a sleep state) and again start the processing from step S106 as interrupt processing that is triggered by a change in the detection result of the optical filter position calculating unit 206. In step S108, a driving amount for insertion is output to the driving waveform generation unit 209. Then, the motor 109 is rotated by a predetermined amount via the motor driver 212, using sine waves that are output from the driving waveform generation unit 209, and the optical filter 108 continuously moves until the optical filter reaches the insertion position. The processing ends after the driving amount is output in step S108.

Here, the optical filter apparatus 10 includes the first optical filter unit 104 and the second optical filter unit 105, and the processing described above can also be applied to processing of a case where the filter units are used in combination. For example, assume that there is an optical filter that needs to be retracted in the first optical filter unit, and there is also an optical filter that needs to be retracted in the second optical filter unit. In this case, driving waveforms for retraction movement are output with respect to both optical filters in step S104, and if the start of movement is detected with respect to both optical filters in step S107, the processing proceeds to step S108. If timings of the start of retraction movement and insertion movement are synchronized between the optical filter units that are arranged in the front-rear direction of the optical axis rather than on the same plane as described above, the optical filter units arranged in the front-rear direction can be kept from separately moving and their movements will not feel unnatural to the user.

According to the first embodiment, when at least two optical filters move on the same plane, it is possible to reduce the time it takes to perform switching of the optical filters, which is determined by a user operation or automatic exposure control, and reduce possibilities of contact and collision between the optical filters.

Second Embodiment

Next, processing for switching optical filters according to the second embodiment will be described.

In the second embodiment, retry control is added to the processing for switching optical filters according to the first embodiment, to detect a failure in movement of an optical filter and again execute the movement. As a result, possibilities of contact and collision between the optical filters can be further reduced when compared to the processing in the first embodiment.

Figure 5:
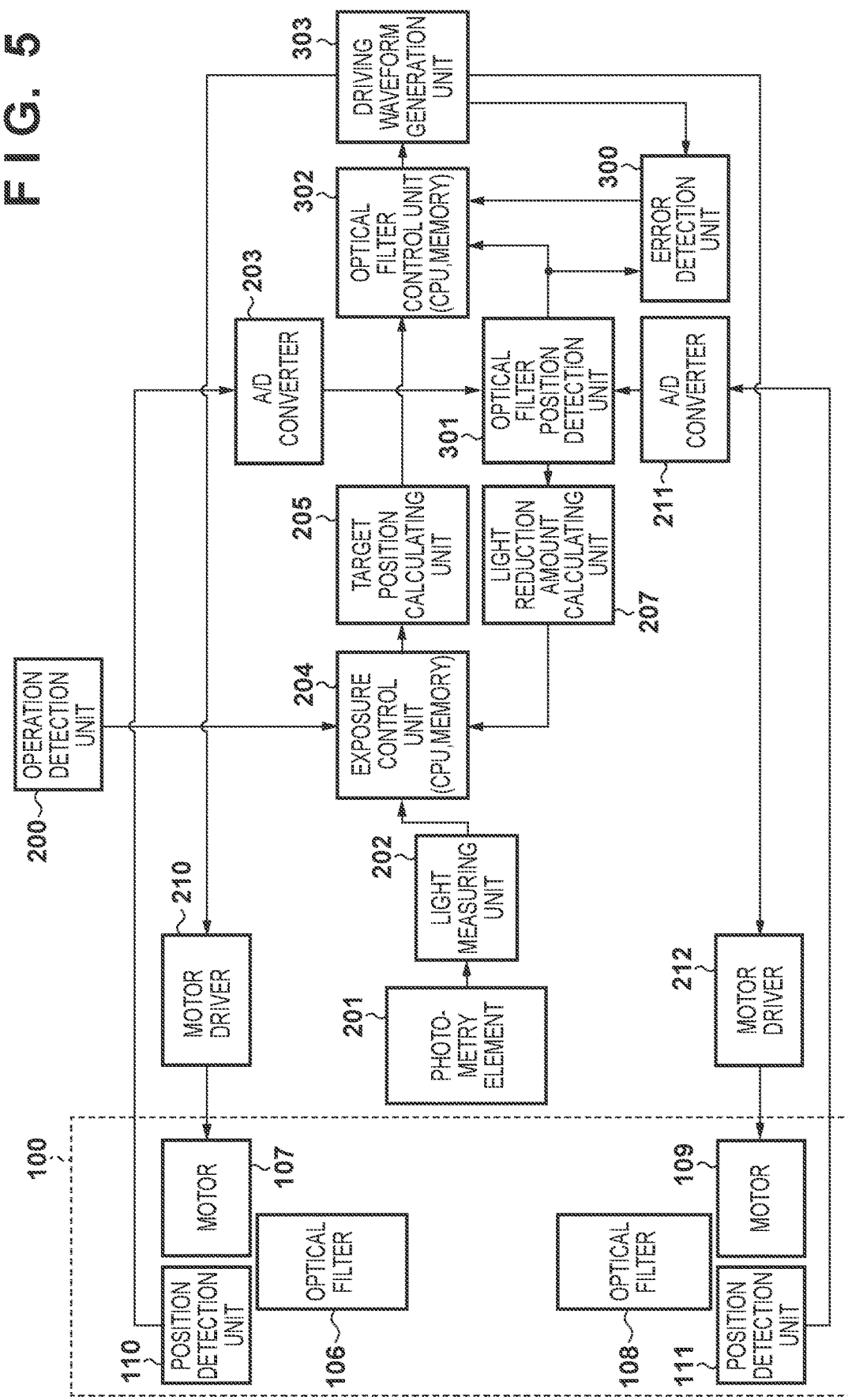
FIG. 5 is a block diagram showing an internal configuration of an optical member control apparatus according to a second embodiment.

FIG. 5 is a block diagram showing an apparatus configuration in the second embodiment, which is an example of a configuration that is obtained by adding an error detection unit 300 to the configuration shown in FIG. 2. An optical filter position detection unit 301, a driving waveform generation unit 303, and an optical filter control unit 302 are denoted with reference signs that are different from those used for corresponding units in the first embodiment because the optical filter position detection unit 301 and the driving waveform generation unit 303 give output to the error detection unit 300 as well and the optical filter control unit 302 performs additional processing when an error occurred based on a result that is output from the error detection unit 300. However, descriptions of the same processing as that performed in the first embodiment will be omitted in the second embodiment.

If a driving waveform has been output from the driving waveform generation unit 303 but an optical filter does not reach the target position, the error detection unit 300 determines that an error has occurred, and outputs an error detection result to the optical filter control unit 302. There are various factors of the occurrence of an error, such as a torque becoming insufficient due to the motor 107 or 109 malfunctioning, a failure occurring in a gear that transmits motive power generated through rotation of the motor to cause upward or downward movement of the optical filter, a failure occurring in a switch of the position detection unit 110 or 111, or the holding member 101 deforming and coming into contact with the optical filter as a result of falling, and obstructing movement of the optical filter.

The driving waveform generation unit 303 can output a sine wave signal according to the number of driving pulses to the motor driver 210 or 212 and output, to an external unit, the number of driving pulses that have already been output at present as a driving waveform. The driving waveform generation unit 303 outputs, to the error detection unit 300, the number of pulses that have been output at present. When the number of already output driving pulses, which is acquired from the driving waveform generation unit 303, has reached the number of driving pulses that is determined in advance as the number of driving pulses required for movement from the insertion position to the retraction position, and if position information regarding the optical filter 106, which is acquired from the optical filter position detection unit 301, does not indicate the retraction position, the error detection unit 300 determines that an error has occurred, and outputs information indicating the occurrence of an error to the optical filter control unit 302. Upon receiving the information indicating the occurrence of an error from the error detection unit 300, the optical filter control unit 302 again outputs the number of driving pulses required for the movement, to the driving waveform generation unit 303. The processing for again moving the optical filter to the retraction position is defined as the retry control. If an error occurs even if the retry control is executed, the user is notified of malfunction after the retry control is repeated a predetermined number of times, and output from the motor driver 210 or 212 is stopped to keep a current from flowing to the motor.

In the second embodiment, the timing at which movement of the optical filter 108 is started in the retry control is changed from that at the time of normal operation. At the time of normal operation, movement of the optical filter 108 is started at the timing at which the start of movement of the optical filter 106 is detected, but in the retry control, movement of the optical filter 108 is started after movement of the optical filter 106 to the retraction position is detected. This is because, even if movement of the optical filter 106 can be started in the retry control, there is a possibility of the optical filter 106 failing to normally complete the movement to the retraction position due to an abnormality occurring in the operation of the optical filter 106. If an error has occurred, the possibility of the optical filter 106 stopping at an intermediate position is high when compared to the time of normal operation, and therefore it is necessary to strengthen measures to avoid collision between the optical filters.

Figure 6A:
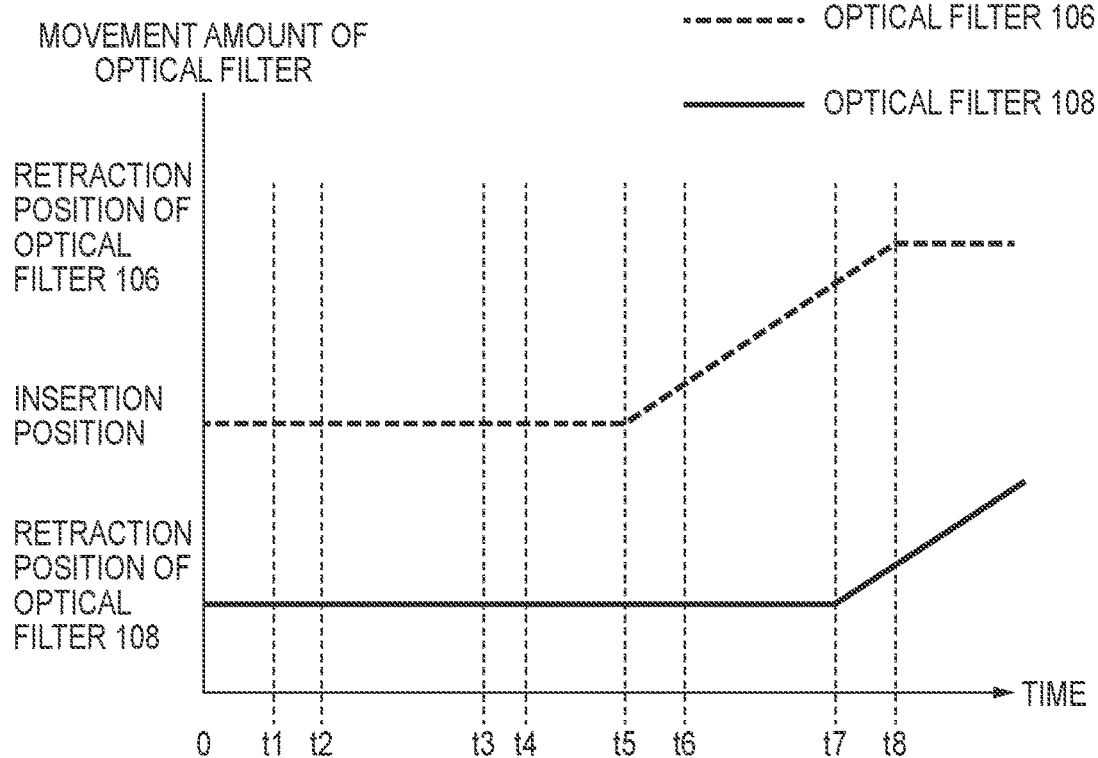
FIGS. 6A and 6B are diagrams showing a relationship between movement amounts and detected positions of optical filters in the second embodiment.
Figure 6B:
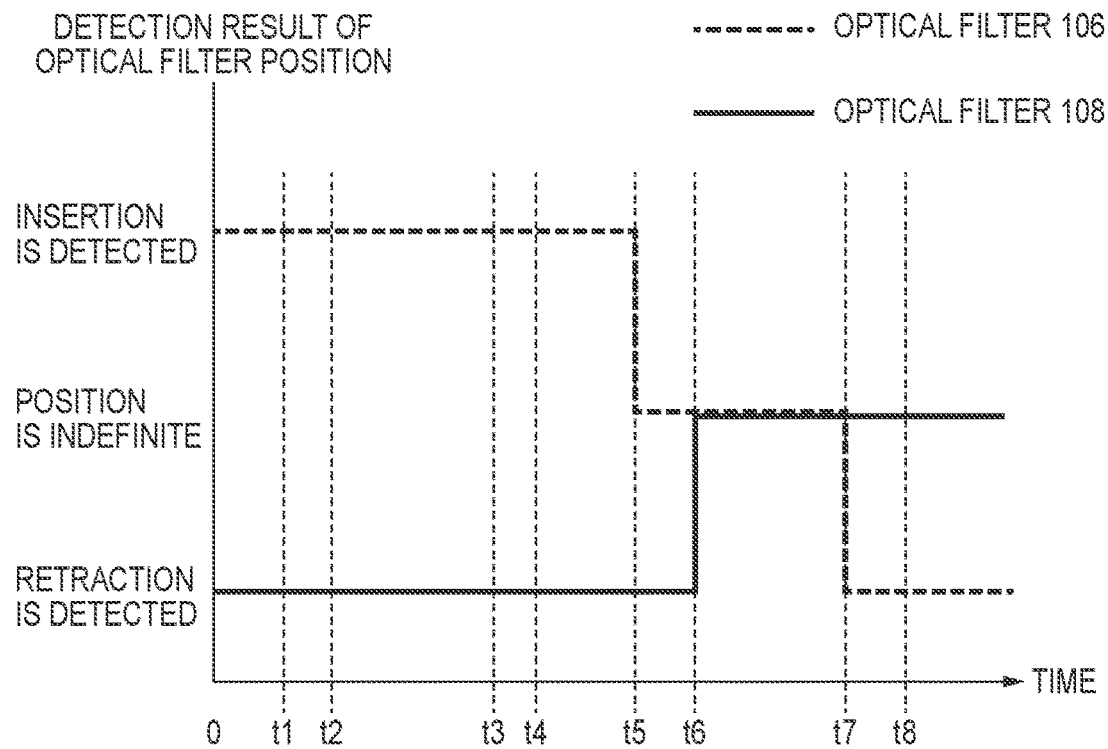

Here, operations performed when the optical filters 106 and 108 are switched according to the second embodiment will be described with reference to FIGS. 6A and 6B. In the present embodiment, assume that movement of the optical filter 106 could not be started in the first driving processing and could be started in the retry control that was performed next.

Similarly to FIGS. 3A and 3B. FIGS. 6A and 6B show a relationship between trajectories of movement and position detection waveforms when the optical filters 106 and 108 are switched according to the second embodiment. In FIG. 6A, the vertical axis indicates movement amounts of the optical filters 106 and 108 and the horizontal axis indicates time points. A graph that is shown with a dashed line shows the trajectory of movement of the optical filter 106, and a graph that is shown with a solid line shows the trajectory of movement of the optical filter 108. In FIG. 6B, the vertical axis indicates position detection results of the optical filters and the horizontal axis indicates time points. A graph that is shown with a dashed line shows the position detection result of the optical filter 106, and a graph that is shown with a solid line shows the position detection result of the optical filter 108. Time points t1 to t4 are the same as those in FIGS. 3A and 3B. If the optical filter normally operates, the optical filter 106 starts to move at the time point t1 at which a driving waveform is output as described with reference to FIGS. 3A and 3B. However, if the optical filter 106 could not start to move for some reason, the detection result of the optical filter position detection unit 301 does not change from the insertion position at the time point t1 as shown in FIGS. 6A and 6B. At this time point, the error detection unit 300 does not detect occurrence of an error. At the time point t4, the number of already output driving pulses, of which information is given from the driving waveform generation unit 303, has reached the number of driving pulses required for retraction driving, but the position of the optical filter does not change from the insertion position. Therefore, the error detection unit 300 detects occurrence of an error at this time point, and notifies the optical filter control unit 302 of the occurrence of an error. Upon receiving information indicating the occurrence of an error, the optical filter control unit 302 shifts to retry control processing. In the retry control, the timing at which movement of the optical filter 108 is started is changed from that at the time of normal operation, as described above. At a time point t5, the optical filter control unit 302 outputs the number of driving pulses to the driving waveform generation unit 303 in the retry control processing, and movement of the optical filter 106 is started at the time point t5. At a time point t5, the insertion position side switch for the optical filter 106 is turned OFF, and the optical filter position detection unit 301 outputs position information indicating that the position is indefinite regarding the optical filter 106. At the time of normal operation, movement of the optical filter 108 is started at the time point t6, but in the retry control, movement of the optical filter 108 is not started until the optical filter 106 again reaches the retraction position. At a time point t7, the retraction position side switch for the optical filter 106 is turned ON, i.e., the optical filter position detection unit 301 outputs position information indicating the retraction position regarding the optical filter 106. As a result, at the time point 7, the optical filter control unit 302 starts movement of the optical filter 108 to the insertion position.

Figure 7A:
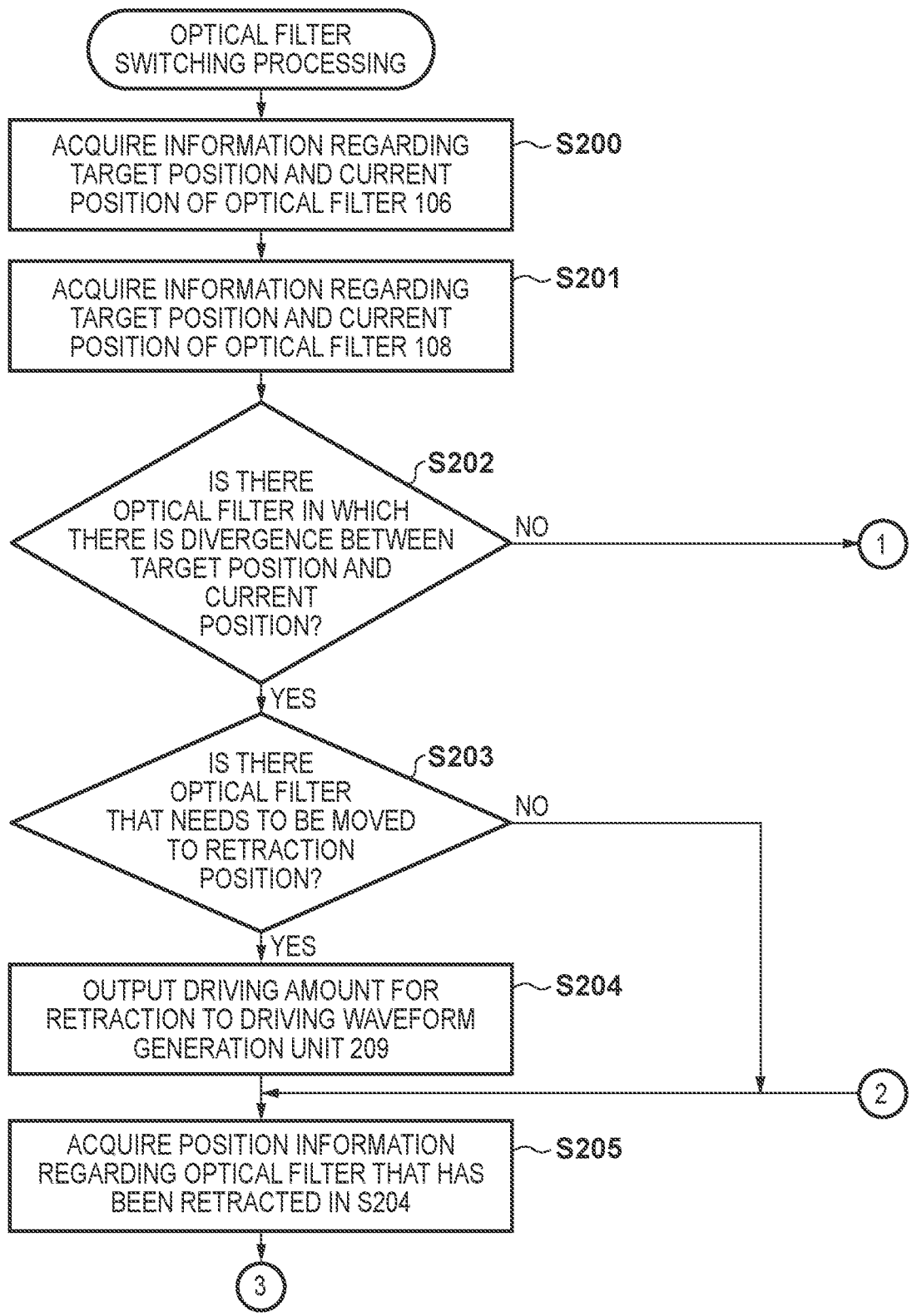
FIGS. 7A and 7B are flowcharts showing control processing relating to operations for switching optical filters in the second embodiment.
Figure 7B:
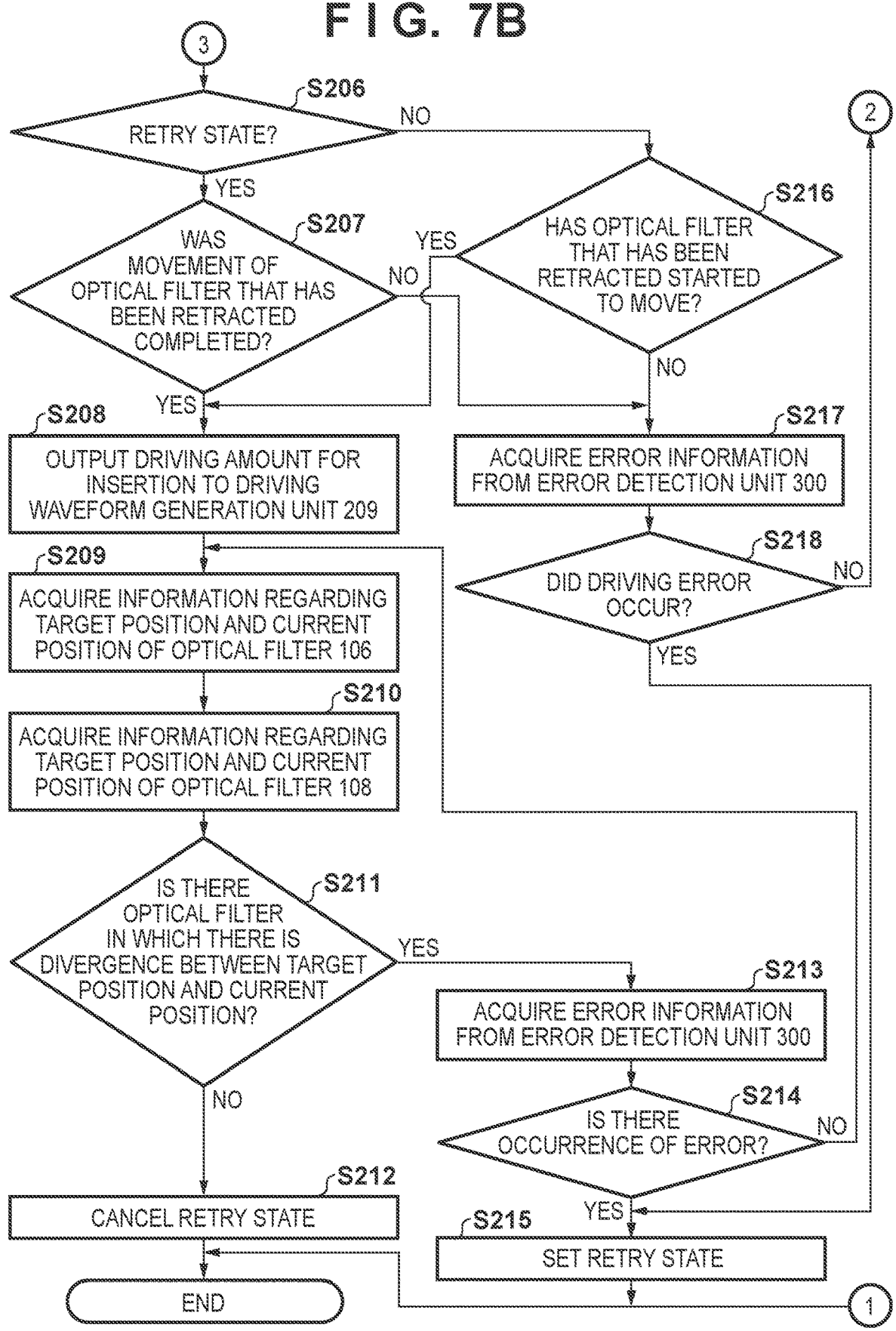

Next, control processing performed by the optical filter control unit (hereinafter referred to as a "control unit") 302 to realize operations for switching the optical filters according to the present embodiment will be described with reference to FIGS. 7A and 7B. Note that, in the processing shown in FIGS. 7A and 7B, steps that differ from those in the processing shown in FIG. 4 are denoted with reference signs that differ from those used in FIG. 4, and the following describes the steps that differ from those described with reference to FIG. 4.

Similarly to the processing in the first embodiment, the optical filter control unit 302 determines whether or not there is an optical filter that needs to be moved, based on target positions and current positions of the optical filters 106 and 108. If there is an optical filter that needs to be moved to the retraction position, first, retraction movement is started (steps S200 to S204). Thereafter, in the first embodiment, insertion movement of the optical filter 108 is started at the timing at which retraction movement of the optical filter 106 is started, but in the second embodiment, whether or not a retry state is set is initially determined in step S206. The retry state is a state where processing for again outputting a required driving waveform occurs in a case where an optical filter could not reach the target position even if a driving waveform required for the movement was output from the driving waveform generation unit 303 as described above. The optical filter control unit 302 manages flag information that indicates the retry state, and performs the determination in step S206 based on whether the flag indicating the retry state is true or false. Note that processing for setting or canceling the flag indicating the retry state, for which a determination is made in step S206, will be described later.

If it is determined in step S206 that the retry state is set, the timing at which movement of the optical filter 108 is started is set to be after completion of movement of the optical filter 106 to the retraction position. If it is determined in step S206 that the retry state is set, the control unit 302 proceeds to step S207 and determines whether or not movement of the optical filter 106 has been completed, in step S207. If completion of the movement of the optical filter 106 is detected, the control unit 302 proceeds to step S208 and starts processing for insertion movement of the optical filter 108, and proceeds to step S209.

In steps S209 to S211, the control unit 302 determines whether or not there is an optical filter that needs to be moved, based on the target positions and current positions of the optical filters 106 and 108, similarly to the first processing. The determination performed in step S211 is processing for confirming that movement of all optical filters that are current targets of movement has been completed. If it is determined in step S211 that there is no divergence between the target position and the current position, i.e., all optical filters have reached the target positions, the control unit 302 considers that movement has been normally completed, cancels the retry state in step S212, and ends the processing. When movement has been normally completed, the retry state is canceled as described in step S212 in order to avoid a situation in which, as a result of the retry state that has been once set being continued, movement of an optical filter is started after always waiting for movement of the other optical filter to be complete and an unnecessary waiting time occurs. Based on the fact that movement has been normally completed, it is considered that the possibility of malfunction decreased, and the retry state is canceled at the timing at which normal movement is confirmed.

Here, processing in step S213 is performed until movement to the target positions is completed in step S211. In step S213, the control unit 302 acquires error information from the error detection unit 300. In step S214, if there is information indicating occurrence of an error, the control unit 302 proceeds to step S215, and if there is no information indicating occurrence of an error, the control unit 302 returns to step S209 to wait for completion of movement. If there is information indicating occurrence of an error in step S214, the control unit 302 proceeds to step S215, sets the retry state, and ends the processing. Here, the processing is executed in predetermined cycles while the retry state is set. That is, when the processing is again executed, the processing proceeds with the retry state set, and therefore retraction driving processing is performed up to step S205, processing then proceeds to step S207 based on a determination made in step S206, and subsequent processing is executed.

Note that, if the retry state is not set, processing proceeds to step S216 based on a determination made in step S206. In steps following step S216, processing for the optical filter 108 is performed at the timing at which movement of the optical filter 106 is started, similarly to the first embodiment. However, unlike the first embodiment, error determination is performed while detection of the start of movement of the optical filter 106 is waited for. Error information is acquired in step S217, error determination is performed in step S218, and if a driving error is detected, the retry state is set in step S215 similarly to the processing described above. However, although error detection has not been particularly described in the first embodiment, if movement cannot be started due to malfunction of the motor or the like, the processing will be endlessly looped, and therefore processing for getting out of the loop, such as error detection or timeout processing, is necessary.

Here, cases where the occurrence of an error is detected in step S214 include a case where the optical filter 106 stops moving while the optical filter 108 is moving. In this case, there is a possibility of the optical filter 106 colliding with the optical filter 108. If the retry control is performed in such a state of collision, the optical filter 106 may fail to normally move in the state where the optical filter 108 is in contact with the optical filter 106. Therefore, in the processing performed in step S204, for example, a driving waveform for again moving the optical filter 108 to the retraction position may also be generated at the same time as the driving waveform for retraction movement of the optical filter 106 is generated. As a result, the optical filters 106 and 108 move away from each other, and the probability of succeeding in the retry control of the optical filter 106 can be increased. Note that processing for driving the optical filters so as to move away from each other in the retry control will not be described because the only difference between this processing and the processing shown in FIGS. 7A and 7B is processing for outputting a driving amount for retraction with respect to the optical filter 108 as well, to the driving waveform generation unit 303 in step S204 as described above.

Also, as described in the first embodiment, the optical filter apparatus 10 includes the first optical filter unit 104 and the second optical filter unit 105, and the processing described above can also be applied to processing of a case where the filter units are used in combination. For example, if an abnormality occurred when retraction movement was started in the first optical filter unit 104, the retry state is applied to the second optical filter unit 105 as well. That is, if the retry state is set due to the first optical filter unit, processing for starting insertion movement after waiting for completion of retraction movement in step S207 is applied to the second optical filter unit 105 as well. In both of the first optical filter unit 104 and the second optical filter unit 105, movement in the insertion direction is started at a timing after a filter that needs to be moved to the retraction position has reached the retraction position. Even if an error occurs in retraction movement in the first optical filter unit 104, the error does not affect filter insertion operations in the second optical filter unit 105. However, even if movement is completed only in the second optical filter unit 105 earlier than completion of movement in the first optical filter unit 104, a light reduction amount desired by the user is a total light reduction amount of the first optical filter unit 104 and the second optical filter unit 105. Therefore, in terms of the function of adjusting the light reduction amount, there is no meaning in only moving the second optical filter unit unless movement to target positions is not completed in the first optical filter unit 104, and furthermore, if the optical filter units arranged in the front-rear direction rather than on the same plane separately move, their movements lack unity and feel unnatural to the user. For the reasons described above, the first optical filter unit 104 and the second optical filter unit 105 are not independently controlled, and timings of the start of retraction movement and insertion movement are synchronized between the optical filter units.

With the processing for switching the optical filters according to the second embodiment, even if an abnormality occurs when driving is started or being performed in the optical filter apparatus, possibilities of contact and collision between the filters can be minimized by changing movement control from that at the time of normal operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-071198, filed Apr. 10, 2020 which is hereby incorporated by reference herein in its entirety.

What is claimed is:

1. An optical member control apparatus comprising:
a first optical member and a second optical member that are arranged to be movable on the same plane that intersects an optical path of light that enters an image capturing element;
a drive unit capable of independently moving the first optical member and the second optical member;
a position detection unit capable of detecting an insertion position and a retraction position of each of the first and second optical members, the insertion position of each optical member corresponding to a state where the optical member has been inserted into the optical path, the retraction position of each optical member corresponding to a state where the optical member has retracted from the optical path; and
a memory and at least one processor and/or at least one circuit which function as:
a control unit configured to control movement of the first optical member and the second optical member,
wherein, when movement is performed to insert either one of the first optical member and the second optical member into the optical path and to retract the other of the first optical member and the second optical member from the optical path, the control unit performs control such that movement of the optical member that is to be inserted into the optical path is started after movement of the optical member that is to be retracted from the optical path is started and before the movement is complete;

wherein when movement is performed to insert either one of the first optical member and the second optical member into the optical path and to retract the other of the first optical member and the second optical member from the optical path, the control unit gives the drive unit a driving amount that is required to move the optical member that is to be retracted from the optical path to a predetermined position, and if it cannot be detected that the optical member has reached the predetermined position after a predetermined period of time has elapsed, the control unit performs retry control in which the control unit again gives the drive unit a driving amount that is required to move the optical member to the predetermined position.

2. The apparatus according to claim 1, wherein in the retry control, movement of the optical member that is to be inserted into the optical path is started at least after the optical member that is to be retracted from the optical path has moved to the outside of the optical path.

3. The apparatus according to claim 1, wherein in a case where the retry control is performed, the control unit performs control to move the optical member that is to be inserted into the optical path to a position where the optical member was located before insertion was started.

4. The apparatus according to claim 1, further comprising a third optical member and a fourth optical member that are arranged to be movable on the same plane that is different from the plane on which the first optical member and the second optical member move, wherein the control unit synchronizes timings of retraction movement from the optical path and insertion movement to the optical path in an operation for switching the first and second optical members with timings of retraction movement from the optical path and insertion movement to the optical path in an operation for switching the third and fourth optical members.

5. The apparatus according to claim 1, wherein the position detection unit is capable of detecting at least a state where the first optical member has been inserted into the optical path, a state where the first optical member has retracted from the optical path, a state where the second optical member has been inserted into the optical path, and a state where the second optical member has retracted from the optical path.

6. A method of controlling an optical member control apparatus which has a first optical member, a second optical member, and a drive unit, the first optical member and the second optical member being arranged to be movable on the same plane that intersects an optical path of light that enters an image capturing element, the drive unit being capable of independently moving the first optical member and the second optical member, the method comprising:
controlling movement of the first optical member and the second optical member,
detecting an insertion position and a retraction position of each of the first and second optical members, the insertion position of each optical member corresponding to a state where the optical member has been inserted into the optical path, the retraction position of each optical member corresponding to a state where the optical member has retracted from the optical path, wherein, in the controlling, when movement is performed to insert either one of the first optical member and the second optical member into the optical path and to retract the other of the first optical member and the second optical member from the optical path, control is performed such that movement of the optical member that is to be inserted into the optical path is started after movement of the optical member that is to be retracted from the optical path is started and before the movement is complete;

wherein, in the controlling, when movement is performed to insert either one of the first optical member and the second optical member into the optical path and to retract the other of the first optical member and the second optical member from the optical path, a driving amount that is required to move the optical member that is to be retracted from the optical path to a predetermined position is given, and if it cannot be detected that the optical member has reached the predetermined position after a predetermined period of time has elapsed, a driving amount that is required to move the optical member to the predetermined position is given again.

7. A non-transitory computer-readable storage medium storing a program for causing a computer to execute a method of controlling an optical member control apparatus which has a first optical member, a second optical member, a position detection unit and a drive unit, the first optical member and the second optical member being arranged to be movable on the same plane that intersects an optical path of light that enters an image capturing element, the drive unit being capable of independently moving the first optical member and the second optical member, the position detection unit capable of detecting an insertion position and a retraction position of each of the first and second optical members, the insertion position of each optical member corresponding to a state where the optical member has been inserted into the optical path, the retraction position of each optical member corresponding to a state where the optical member has retracted from the optical path, the method comprising: controlling movement of the first optical member and the second optical member, wherein, in the controlling, when movement is performed to insert either one of the first optical member and the second optical member into the optical path and to retract the other of the first optical member and the second optical member from the optical path, control is performed such that movement of the optical member that is to be inserted into the optical path is started after movement of the optical member that is to be retracted from the optical path is started and before the movement is complete, wherein, in the controlling, when movement is performed to insert either one of the first optical member and the second optical member into the optical path and to retract the other of the first optical member and the second optical member from the optical path, control is performed such that a driving amount that is required to move the optical member that is to be retracted from the optical path to a predetermined position is given, and if it cannot be detected that the optical member has reached the predetermined position after a predetermined period of time has elapsed, control is performed such that a driving amount that is required to move the optical member to the predetermined position is given again for retry control.

8. An image capture apparatus comprising:

an image capturing element; and an optical member control apparatus that comprises a first optical member and a second optical member that are arranged to be movable on the same plane that intersects an optical path of light that enters an image capturing element and that can be inserted into the optical path and can be retracted from the optical path, a drive unit capable of independently moving the first optical member and the second optical member, a position detection unit capable of detecting an insertion position and a retraction position of each of the first and second optical members, the insertion position of each optical member corresponding to a state where the optical member has been inserted into the optical path, the retraction position of each optical member corresponding to a state where the optical member has retracted from the optical path, and a control unit configured to control movement of the first optical member and the second optical member, wherein, when movement is performed to insert either one of the first optical member and the second optical member into the optical path and to retract the other of the first optical member and the second optical member from the optical path, the control unit performs control such that movement of the optical member that is to be inserted into the optical path is started after movement of the optical member that is to be retracted from the optical path is started and before the movement is complete, wherein, when movement is performed to insert either one of the first optical member and the second optical member into the optical path and to retract the other of the first optical member and the second optical member from the optical path, the control unit gives the drive unit a driving amount that is required to move the optical member that is to be retracted from the optical path to a predetermined position, and if it cannot be detected that the optical member has reached the predetermined position after a predetermined period of time has elapsed, the control unit performs retry control in which the control unit again gives the drive unit a driving amount that is required to move the optical member to the predetermined position.

9. An image capture apparatus comprising an image capturing element, wherein the image capture apparatus is configured such that an optical member control apparatus is attachable to and detachable from the image capture apparatus, and the optical member control apparatus comprises a first optical member and a second optical member that are arranged to be movable on the same plane that intersects an optical path of light that enters an image capturing element and that can be inserted into the optical path and can be retracted from the optical path, a drive unit capable of independently moving the first optical member and the second optical member, a position detection unit capable of detecting an insertion position and a retraction position of each of the first and second optical members, the insertion position of each optical member corresponding to a state where the optical member has been inserted into the optical path, the retraction position of each optical member corresponding to a state where the optical member has retracted from the optical path, and a control unit configured to control movement of the first optical member and the second optical member, wherein, when movement is performed to insert either one of the first optical member and the second optical member into the optical path and to retract the other of the first optical member and the second optical member from the optical path, the control unit performs control such that movement of the optical member that is to be inserted into the optical path is started after movement of the optical member that is to be retracted from the optical path is started and before the movement is complete, wherein, when movement is performed to insert either one of the first optical member and the second optical member into the optical path and to retract the other of the first optical member and the second optical member from the optical path, the control unit gives the drive unit a driving amount that is required to move the optical member that is to be retracted from the optical path to a predetermined position, and if it cannot be detected that the optical member has reached the predetermined position after a predetermined period of time has elapsed, the control unit performs retry control in which the control unit again gives the drive unit a driving amount that is required to move the optical member to the predetermined position.

* * * * *